United States Patent
Lee et al.

(10) Patent No.: US 12,093,108 B2
(45) Date of Patent: Sep. 17, 2024

(54) METHOD OF CONTROLLING MEMORY AND ELECTRONIC DEVICE PERFORMING THE METHOD

(71) Applicant: Samsung Electronics Co., Ltd., Gyeonggi-do (KR)

(72) Inventors: Myungkee Lee, Gyeonggi-do (KR); Chiwoong Byun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 18/110,072

(22) Filed: Feb. 15, 2023

(65) Prior Publication Data

US 2023/0195195 A1    Jun. 22, 2023

Related U.S. Application Data (63) Continuation of application No. PCT/KR2022/012869, filed on Aug. 29, 2022.

(30) Foreign Application Priority Data

Oct. 12, 2021    (KR) .................. 10-2021-0135108

(51) Int. Cl.
*G06F 1/32* (2019.01)
*G06F 1/3225* (2019.01)
*G06F 1/3234* (2019.01)

(52) U.S. Cl.
CPC .......... *G06F 1/3225* (2013.01); *G06F 1/3275* (2013.01)

(58) Field of Classification Search
CPC ........................... G06F 1/3225; G06F 1/3275
See application file for complete search history.

(56) References Cited

U.S. PATENT DOCUMENTS

| | | | |
|---|---|---|---|
| 8,111,575 B2 * | 2/2012 | Mori | G11C 11/4072 713/320 |
| 2003/0058016 A1 | 3/2003 | Mizugaki | |
| 2005/0125597 A1 | 6/2005 | Lovett | |
| 2013/0114337 A1 * | 5/2013 | Markov | G11C 29/06 365/185.18 |
| 2013/0173944 A1 * | 7/2013 | Kohler | G11C 11/40626 713/324 |
| 2016/0179164 A1 * | 6/2016 | Park | G06F 1/3206 713/340 |
| 2016/0252938 A1 * | 9/2016 | Oishi | G11C 5/148 713/300 |
| 2016/0275017 A1 * | 9/2016 | Takeda | G06F 12/0893 |

(Continued)

FOREIGN PATENT DOCUMENTS

| | | |
|---|---|---|
| CN | 1494156 A | 5/2004 |
| JP | 5539241 B2 | 7/2014 |

(Continued)

*Primary Examiner* — Zahid Choudhury
(74) *Attorney, Agent, or Firm* — Cha & Reiter, LLC (57) ABSTRACT

Provided are a memory control method and an electronic device performing the method. A memory control method according to an embodiment may include measuring an internal temperature of a processor by a thermal manage unit, predicting a leakage current of a first memory based on the internal temperature and a voltage applied to the first memory, and controlling the operation of the first memory. The processor may access a second memory following accessing the first memory.

14 Claims, 6 Drawing Sheets

(56) References Cited

U.S. PATENT DOCUMENTS

| | | | |
|---|---|---|---|
| 2018/0275185 A1* | 9/2018 | Essawy | G01K 15/007 |
| 2019/0266107 A1* | 8/2019 | Murphy | G06F 11/1004 |
| 2023/0195195 A1* | 6/2023 | Lee | G06F 1/3275 |
| | | | 713/320 |

FOREIGN PATENT DOCUMENTS

| | | |
|---|---|---|
| JP | 2016-162476 A | 9/2016 |
| KR | 10-2009-0027679 A | 3/2009 |
| KR | 10-1702385 B1 | 2/2017 |
| KR | 10-2060430 B1 | 2/2020 |
| KR | 10-2020-0104601 A | 9/2020 |
| WO | 2018/128816 A1 | 7/2018 |

\* cited by examiner

METHOD OF CONTROLLING MEMORY AND ELECTRONIC DEVICE PERFORMING THE METHOD

CROSS-REFERENCE TO RELATED APPLICATIONS

This application is a continuation of International Application No. PCT/KR2022/012869 designating the United States, filed on Aug. 29, 2022, in the Korean Intellectual Property Receiving Office and claiming priority to Korean Patent Application No. 10-2021-0135108, filed on Oct. 12, 2021, in the Korean Intellectual Property Office, the disclosures of which are incorporated by reference herein in their entireties.

BACKGROUND

1. Field of the Invention

One or more embodiments of the present disclosure generally relate to a memory control method and an electronic device performing the method.

2. Description of Related Art

A microprocessor and an application processor (AP) require a memory to process data and may use large-capacity dynamic random access memory (DRAM).

Frequent access of the DRAM by the processor increases power consumption, and a cache memory made of static random access memory (SRAM) may be used to alleviate the power consumption.

Using the SRAM may reduce the usage of the DRAM, which may reduce the power used for the DRAM and the corresponding memory interface. However, leakage power may occur in the SRAM.

SUMMARY

An SRAM capacity increase attributable to process miniaturization and terminal performance improvement may generate heat due to the leakage current of the SRAM. The surge in SRAM current may generate an amount of SRAM leakage current at a high temperature that exceeds the amount of power consumption improved by the decrease in DRAM access.

According to an embodiment, there is provided a memory control method including measuring an internal temperature of a processor in a thermal manage unit, predicting a leakage current of a first memory based on the internal temperature and a voltage applied to the first memory, and controlling the operation of the first memory based on the predicted leakage current, wherein the processor may access a second memory after accessing the first memory.

A memory control method according to an embodiment may include measuring an internal temperature of a processor in a thermal manage unit, determining a policy based on the temperature, transmitting the policy to a first memory manager to control an operation of the first memory under the policy, wherein the processor may access a second memory after accessing the first memory.

An electronic device according to an embodiment may include a first memory, a second memory, a processor that accesses the second memory after accessing the first memory, and a thermal manage unit that measures an internal temperature of the processor, wherein the processor may identify an internal temperature of the processor measured by the thermal manage unit, predict a leakage current of the first memory based on the temperature and a voltage applied to the first memory, and control the operation of the first memory based on the predicted leakage current.

An electronic device according to an embodiment includes a first memory, a second memory, a processor that accesses the second memory after accessing the first memory, and a thermal manage unit that measures a temperature inside the processor, wherein the processor may identify the temperature of the processor measured by the thermal manage unit, determine a policy regarding the operation of the first memory based on the temperature, and transmit the policy to a first memory manager to control the operation of the first memory according to the policy.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be apparent from the following detailed description, taken in conjunction with the accompanying drawings, in which.

DETAILED DESCRIPTION

According to certain embodiments disclosed herein, provided are an electronic device and a memory control method which may predict the leakage current of a first memory based on change in voltage and temperature of the first memory, and control the operation of the first memory based on the predicted current.

According to certain embodiments disclosed herein, provided are an electronic device and a memory control method which may predict the leakage current of the first memory and compare power consumption when accessing a second memory, thereby decreasing the power consumption and temperature.

According to certain embodiments disclosed herein, the leakage current of a first memory may be predicted based on the temperature of a processor and/or the voltage applied to the first memory.

According to certain embodiments disclosed herein, the leakage current of the first memory may be estimated to control the operation of the first memory, thereby decreasing the total current and power consumed by the processor to access the memory and reducing the temperature of the processor.

Hereinafter, example embodiments will be described in detail with reference to the accompanying drawings. When describing the example embodiments with reference to the accompanying drawings, like reference numerals refer to like elements and a repeated description related thereto will be omitted.

Figure 1:
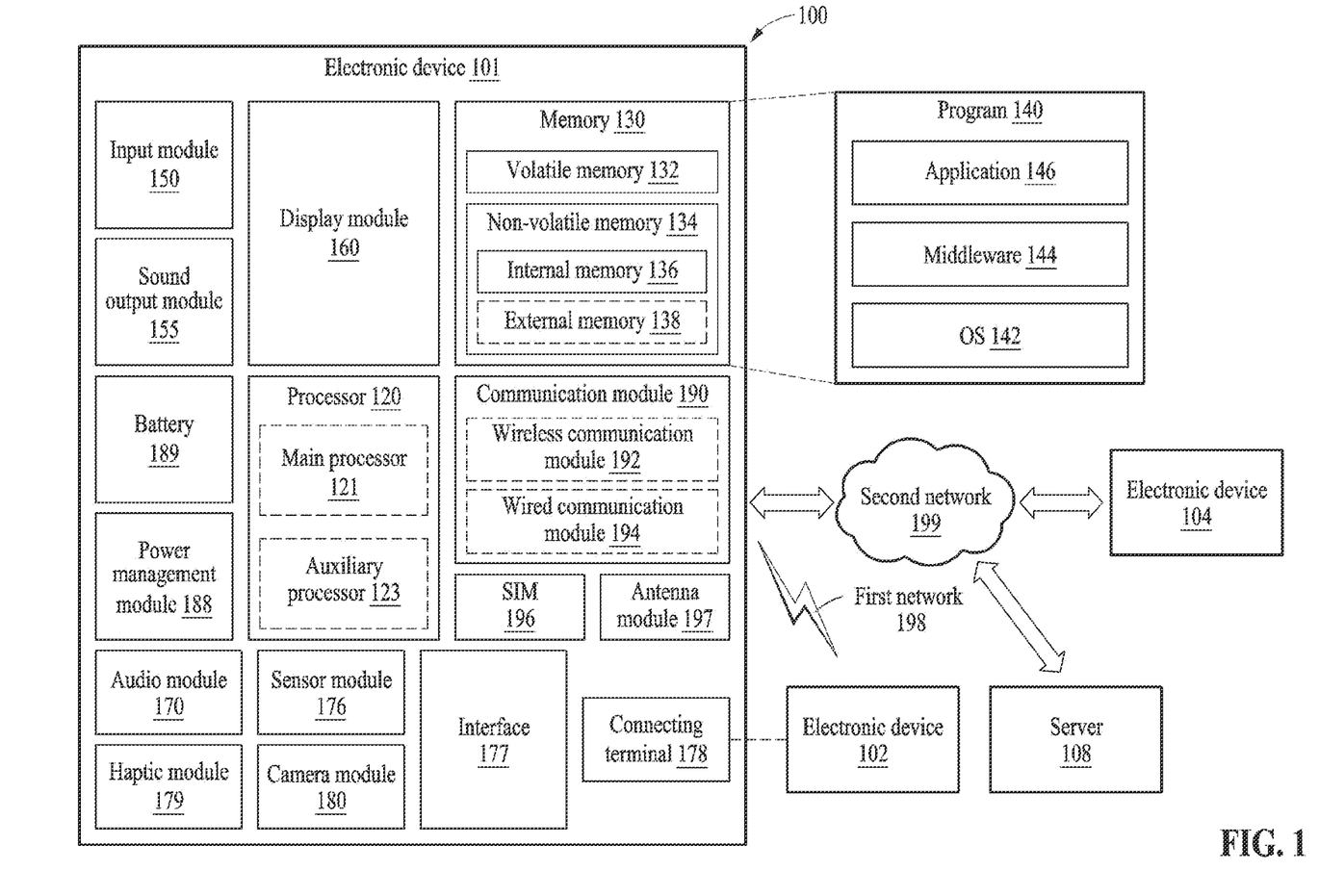
FIG. 1 is a block diagram illustrating an example electronic device in a network environment according to an embodiment.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be predetermined to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an embodiment, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
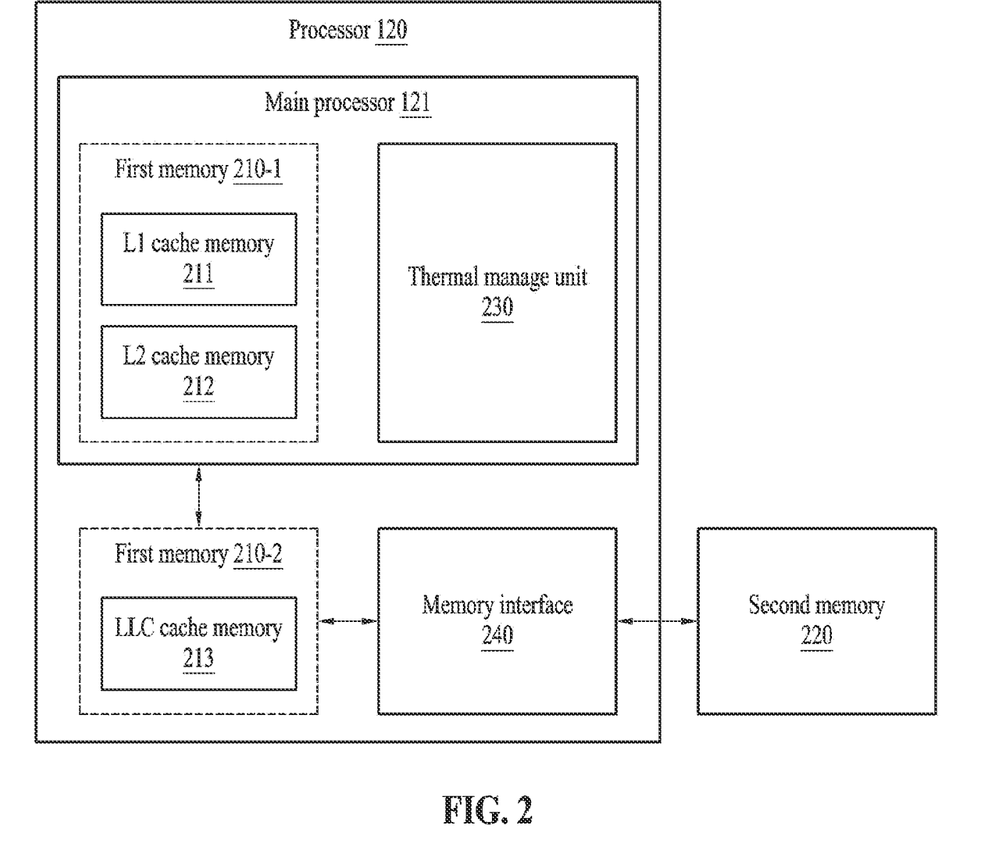
FIG. 2 is a drawing illustrating the operation of a processor according to an embodiment.

FIG. 2 is a drawing illustrating the operation of a processor 120 according to an embodiment.

Referring to FIG. 2, the processor 120 according to an embodiment may include a main processor 121, a first memory 210, a thermal manage unit, and a memory interface 240. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment, the processor 120 may access at least one of the first memory 210 and a second memory 220. For example, the processor 120 may access the second memory 220 after accessing the first memory 210. For example, the processor 120 may access the first memory 210 to search for data, and access the second memory 220 when the data is not stored in the first memory 210.

According to an embodiment, the first memory 210-1 and 210-2 may include a plurality of cache memories 211, 212, and 213. The first memory 210-1 and 210-2 may include, for example, an L1 cache memory 211, an L2 cache memory 212, and a last level cache (LLC) memory. For example, the L1 cache memory 211 and the L2 cache memory 212 of the first memory 210-1 and 210-2 may be included in the main processor 121, and the LLC memory 213 may be included in the processor 120.

As another example, the L1 cache memory 211 and the L2 cache memory 212 of the first memory 210-1 and 210-2 may be included in the processor 120, and the LLC memory 213 may be disposed outside the processor 120, or the L1 cache memory 211, the L2 cache memory 212 and the LLC memory 213 may be disposed outside the processor 120.

For example, the LLC memory 213 of the first memory 210-2 may be the last level cache memory of various levels. As another example different from the one shown in FIG. 2, the first memory 210 may include cache memories formed in various levels such as the first memory including the L1 cache memory 211 and the LLC memory 213, or the first memory including the L1 cache memory 211, the L2 cache memory 212, a L3 cache memory and the LLC memory 213.

For example, the L1 cache memory 211, the L2 cache memory 212, and the LLC memory 213 may vary in capacity and speed. For example, the processor 120 may access the L1 cache memory 211, the L2 cache memory 212, the L3 cache memory (not shown), and the LLC memory 213 in that order.

According to an embodiment, the processor 120 may access the second memory 220 using the memory interface 240. The second memory 220 may be disposed outside the processor 120.

According to an embodiment, the first memory 210 may be an SRAM, and the second memory 220 may be a DRAM. For example, the magnitude of the leakage current of the first memory may vary depending on temperature and an applied voltage.

According to an embodiment, a thermal manage unit (TMU) 230 may measure the temperature inside and/or on a surface of the processor 120. For example, the processor 120 may identify the internal temperature of the processor 120 measure by the thermal manage unit 230.

According to an embodiment, the processor 120 may predict the leakage current of the first memory 210 based on temperature and the voltage applied to the first memory 210. For example, the leakage current of the first memory 210 may vary depending on the temperature and the voltage applied to the first memory 210. For example, the greater the temperature and/or the voltage applied to the first memory 210, the greater the leakage current of the first memory 210. For example, the processor 120 may predict the leakage current of the first memory 210, and the magnitude of the current applied to the first memory 210.

For example, the processor 120 may identify the temperature measured by the thermal manage unit 230 and the voltage applied to the first memory 210. The processor 120 may predict the leakage current of the first memory 210 according to the temperature and the voltage applied to the first memory 210.

Figure 3:
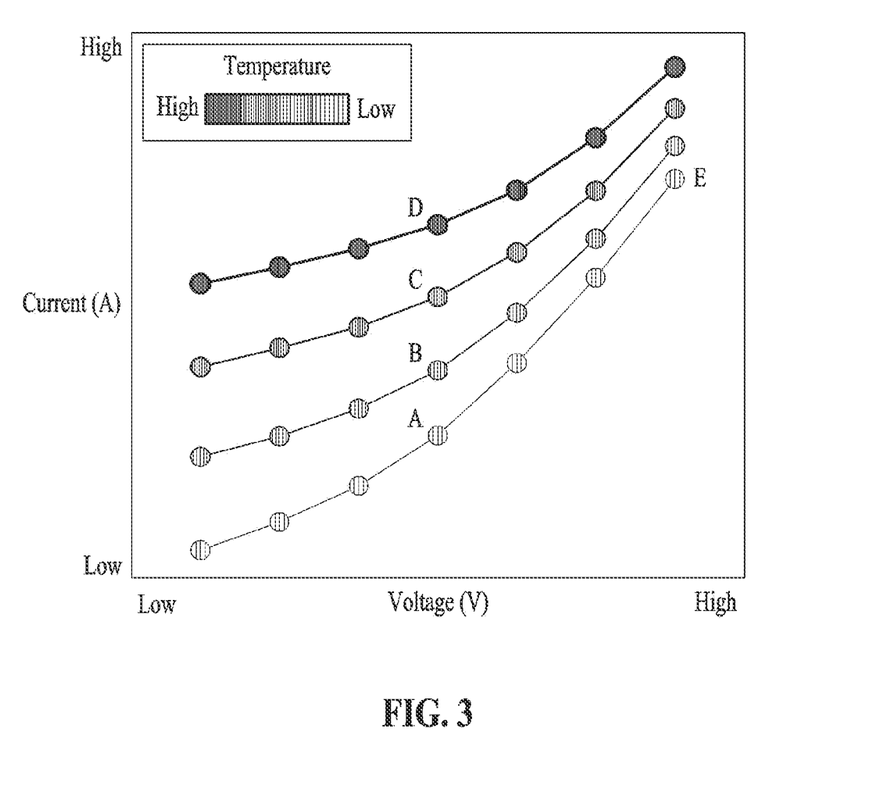
FIG. 3 is a drawing illustrating a leakage current of a first memory measured according to an embodiment.

For example, the processor 120 may predict the leakage current of the first memory 210 according to the temperature and the voltage applied to the first memory 210, based on a leakage-current reference value measured under preset condition(s). FIG. 3 describes how the processor 120 estimates the leakage current of the first memory 210 based on leakage-current reference values.

For example, the processor 120 may control the operation of the first memory 210 based on the predicted leakage current. For example, when the leakage current of the first memory 210 increases, the processor 120 may turn off all or part of the first memory 210 and access the second memory 220 to reduce total power consumption. In another example, based on the leakage current of the first memory 210, the processor 120 may turn off the first memory 210 and determine whether total power consumption decreases when the processor accesses the second memory 220.

For example, the processor 120 may calculate the power consumption of the first memory 210 due to the leakage current. As another example, the processor 120 may calculate the power consumption of the first memory 210 using the current required for the operation of the first memory 210 and the leakage current of the first memory 210. As a further example, the processor 120 may calculate the power consumption when accessing the second memory 220. According to certain embodiments, the processor 120 may compare the power consumption due to the leakage current of the first memory 210 and the power consumption when accessing the second memory 220.

According to an embodiment, the processor 120 may control the operation of the first memory 210 based on the result of comparing the power consumption of the first memory 210 due to the leakage current and the power consumption when accessing the second memory 220.

For example, the processor 120 compares the power consumption due to the leakage current of the first memory 210 and the power consumption when accessing the second memory 220. In doing so, the processor 120 may calculate the amount of improvement in current consumption and/or power consumption obtained when the processor 120 accesses the first memory instead of the second memory.

For example, when the internal temperature of the processor 120 is low, the power consumption due to the leakage current of the first memory 210 may be low. Thus, in the case of low internal temperature of the processor 120, power consumption due to the leakage current of the first memory is low. Accordingly, the power consumption when the processor accesses the first memory 210 may be lower than the power consumption when the processor accesses the second memory 220. For example, in the case of the low internal temperature of the processor 120, the processor 120 may compare the power consumption of the first memory 210 due to the leakage current with the power consumption when accessing the second memory 220, and calculate the amount of improvement in current consumption or power consumption.

According to an embodiment, the power consumption when the processor accesses the second memory 220 may be less affected by temperature, unlike the first memory 210. In the case of high internal temperature of the processor 120 and a high voltage applied to the first memory 210, the power consumption due to the leakage current of the first memory 210 may be high. In the case of high-power consumption due to the leakage current of the first memory 210, the power consumption when the processor accesses the first memory 210 may be greater than the power consumption when the processor accesses the second memory 220. For example, when the power consumption of the first memory 210 due to the leakage current of the first memory is greater than the power consumption of the second memory 220, the processor 120 may turn off all or part of the first memory 210 and access the second memory 220.

The processor 120 may, for example, turn off all or part of the first memory 210 and access the second memory 220, and read or write data stored in the second memory 220 instead of reading or writing data stored in the turned-off first memory 210.

For example, the processor 120 may control the operation of at least one cache memory in the plurality of cache memories of the first memory 210. Referring to FIG. 2, the processor 120 may, for example, turn off the LLC memory 213 based on the leakage current. For example, when the power consumption of the first memory 210 due to the leakage current is greater than the power consumption of the second memory 220, the processor 120 may turn off the LLC memory 213. As another example, the processor 120 may turn off the L2 memory and the LLC memory 213 based on the leakage current. Controlling the operation of the first memory 210 is not limited to the example embodiments herein, and the processor 120 may control the operation of the first memory in various ways, such as turning off the L1 cache memory 211, turning off the L2 cache memory 212, or turning off the L1 cache memory 211, to the L2 cache memory 212, and the LLC memory 213.

FIG. 2 is a diagram illustrating the operation of the processor 120 including the main processor 121 according to an embodiment. As shown in FIG. 2, the processor 120 may include the first memory 210, the thermal manage unit 230, and the memory interface 240.

FIG. 3 is a diagram illustrating a leakage current of a first memory (e.g., the first memory 210-1 and 210-2 in FIG. 2) measured according to an embodiment of the present disclosure. FIG. 3 illustrates the leakage current of the first memory measured under various voltage and temperature conditions.

Referring to FIG. 3, an electronic device according to an embodiment may predict the leakage current of the first memory according to temperature and the voltage applied to the first memory, by referencing preset leakage-current reference values.

For example, the leakage-current reference values may be one or more leakage currents of the first memory measured under one or more preset temperatures and voltages. For example, the leakage current of the first memory measured at different temperatures at constant voltage is shown as data points A through D in FIG. 3. It may be seen that the temperature at which the leakage current is measured increases from A to B to C to D. For example, the greater the leakage current of the first memory, the higher the temperature under the same voltage. For example, the leakage current value A may be 1 mA, B may be 2 mA, C may be 3 mA and D may be 4 mA in FIG. 3.

For example, the electronic device may store the preset leakage-current reference values. For example, when the leakage-current reference value measured under a preset temperature and voltage condition is A, the electronic device may store the leakage-current reference value A.

For example, when the leakage-current reference value of the first memory measured under the preset conditions of 30° C. and 1V is 3 mA, the leakage-current reference value may be stored as 3 mA. As another example, when the leakage current of the first memory measured under the preset conditions of 30° C. and 1V is 1 mA, the leakage-current reference value may be stored as 1 mA.

For example, the electronic device may predict the leakage current of the first memory based on the leakage-current reference values. For example, when analyzing the leakage-current reference value A, the leakage current of the first memory may be predicted as one of B, C, and D according to the internal temperature of the processor. For example, when a measured internal temperature of the processor is high, the magnitude of the leakage current may be predicted as D.

For example, when the leakage-current reference value of the first memory measured under the preset conditions of 30° C. and 1V is 1 mA, the electronic device may predict the leakage current of the first memory as 3 mA at the temperature of 65° C. when the voltage condition is 1V. As another example, when a leakage-current reference value of the first memory measured under the preset conditions of 30° C. and 1V is 3 mA, the electronic device may predict the leakage current of the first memory as 7 mA at the temperature of 65° C. when the voltage condition is 1V.

For example, the electronic device may use the leakage-current reference values of the first memory to predict that the greater the temperature of the processor from the temperature when the leakage-current reference value is measured, the greater the leakage current of the first memory will be. For example, when the temperature of the processor is the same as the temperature when the leakage-current reference value is measured, the predicted leakage current of the first memory may vary depending on reference leakage current values. In this example, when the leakage-current reference value is A, if the voltage applied to the first memory is greater than a preset voltage, the processor may predict the leakage current of the first memory to be E.

For example, when the leakage-current reference value of the first memory measured under the preset conditions of 30° C. and 1V is 1 mA, the electronic device may predict that the leakage current of the first memory is 3 mA at the voltage of 1.5V applied to the first memory. When the leakage-current reference value of the first memory measured under the preset conditions of 30° C. and 1V is 3 mA, the leakage current of the first memory at the voltage of 1.5V may be predicted as 7 mA.

For example, the electronic device may use the voltage applied to the first memory to predict that the greater the voltage applied to the first memory from the voltage when the leakage-current reference value is measured, the greater the leakage current of the first memory.

The magnitude of leakage current of the first memory shown in FIG. 3 is measured under various temperature and voltage conditions. The electronic device may compare an internal temperature of the processor and the voltage applied to the first memory with the temperature and the voltage preset to measure leakage-current reference values and predict the leakage current of the first memory.

Figure 4:
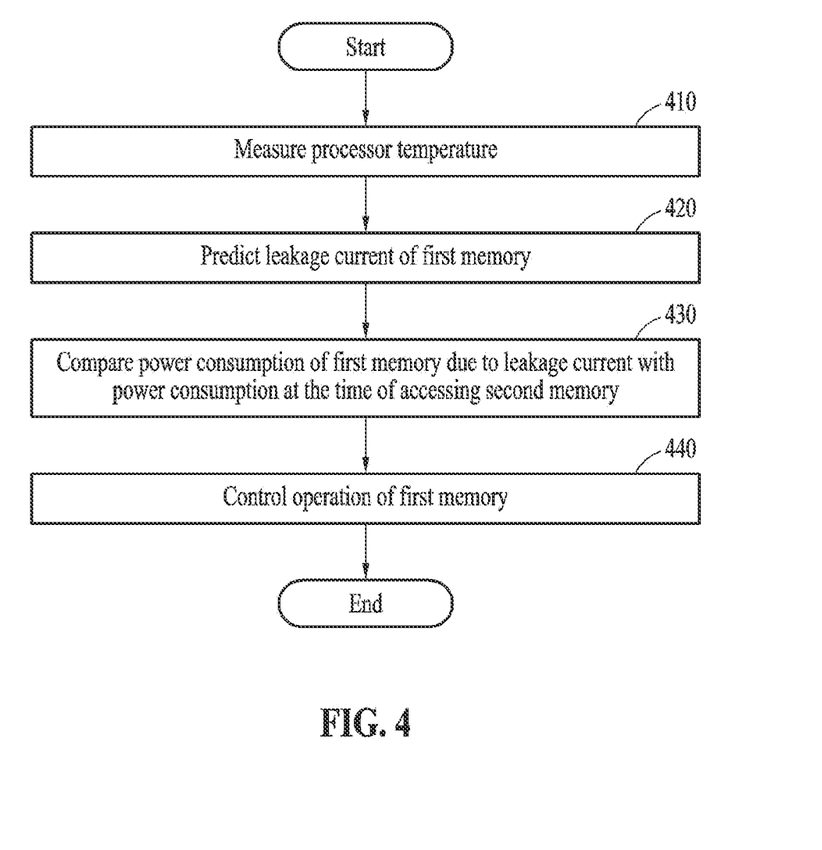
FIG. 4 is a drawing illustrating a memory control method according to an embodiment of the present disclosure.

FIG. 4 is a drawing illustrating a memory control method according to an embodiment.

Referring to FIG. 4, an electronic device according to an embodiment may identify the internal temperature of a processor (e.g., the processor 120 in FIG. 1) in operation 410. A thermal manage unit may, for example, measure the internal temperature of the processor, and the processor may identify the measured temperature.

The electronic device according to an embodiment may predict the leakage current of a first memory (e.g., the first memory 210-1 and 210-2 in FIG. 2) in operation 420. For example, the processor may predict the leakage current of the first memory based on the internal temperature of the processor and the voltage applied to the first memory. The processor may, for example, store leakage-current reference values measured under one or more preset conditions. The processor may compare the internal temperature of the processor and the voltage applied to the first memory with the temperature and the voltage at which a particular leakage-current reference value is measured and predict the leakage current of the first memory.

In operation 430, the electronic device according to an embodiment may compare the power consumption of the first memory due to the leakage current with the power consumption when the processor accesses a second memory (e.g., the second memory 220 in FIG. 2). For example, when the internal temperature of the processor or the voltage applied to the first memory increases, a growing leakage current of the first memory may raise the power consumption of the first memory.

The electronic device according to an embodiment may control the operation of the first memory based on the leakage current in operation 440. For example, when the predicted leakage current value is equal to or greater than a preset threshold value, the electronic device may control the operation of the first memory. For example, when the power consumption of the first memory due to the leakage current is greater than the power consumption when the processor accesses the second memory, the electronic device may control the operation of the first memory.

In one example, the processor may turn off all or part of an L1 cache memory (e.g., the L1 cache memory 211 in FIG. 2), an L2 cache memory (e.g., the L2 cache memory 212 in FIG. 2), and an LLC memory (e.g., the LLC memory 213 in FIG. 2) of the first memory.

Figure 5:
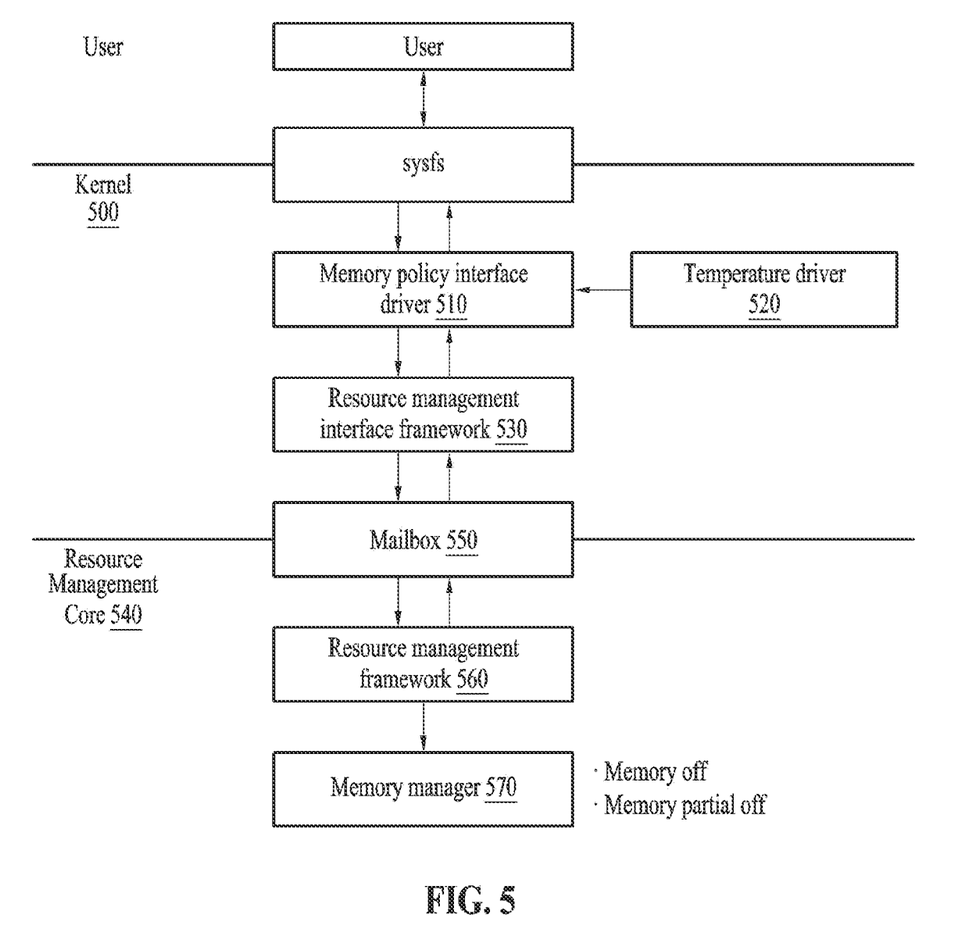
FIG. 5 is a drawing illustrating a memory control method according to an embodiment of the present disclosure.

FIG. 5 is a drawing illustrating a memory control method according to an embodiment of the present disclosure. A kernel 500, a memory-policy interface driver 510, a temperature driver 520, a resource-management interface framework 530, a resource management core 540, a mailbox 550, a resource management framework 560 and a first memory manager 570 shown in FIG. 5 may be program modules executed by a processor (e.g., the processor 120 in FIG. 1).

As an example, the kernel 500, the memory-policy interface driver 510, the temperature driver 520, the resource-management interface framework 530, the resource management core 540, the mailbox 550, the management framework 560 and the first memory manager 570 shown in FIG. 5 may be stored in a program (e.g., the program 140 in FIG. 1).

Referring to FIG. 5, the memory-policy interface driver 510 of an electronic device (e.g., the electronic device 101 in FIG. 1) according to an embodiment may receive information about temperature of the processor (e.g., the processor 120 in FIG. 1) from the temperature driver 520. As an example, the temperature of the processor may be measured by a thermal manage unit (e.g., the thermal manage unit 230 in FIG. 2).

The electronic device according to an embodiment may determine a policy on the operation of the first memory (e.g., the first memory 210-1 and 210-2 in FIG. 2) based on the temperature. For example, the memory-policy interface driver 510 may determine the policy regarding the operation of the first memory based on the temperature.

For example, the memory-policy interface driver 510 may predict the leakage current of the first memory based on the temperature and the voltage applied to the first memory. For example, the memory-policy interface driver 510 may compare the power consumption of the first memory due to the predicted leakage current with the power consumption when the processor accesses a second memory (e.g., the second memory 220 in FIG. 2) to determine the policy.

For example, when the leakage current is predicted to be 3 mA at 1V applied to the first memory and 65° C., the power consumption due to the leakage current of the first memory may be predicted to be 3 mW.

For example, the policy determined by the memory-policy interface driver 510 may control the operation of a plurality of cache memories included in the first memory. For example, according to the policy determined by the memory-policy interface driver, the operation of the first memory may be controlled by, for example, turning off all of an L1 cache memory (e.g., L1 cache memory 211 in FIG. 2), an L2 cache memory (e.g., L2 cache memory 212 in FIG. 2) and an LLC memory (e.g., LLC memory in FIG. 2), or turning off the LLC memory.

The policy determined by the memory-policy interface driver 510 according to an embodiment may include a first policy and a second policy. For example, the first policy may turn off the LLC memory in the plurality of cache memories and allow the processor to access the second memory. As another example, the second policy may turn off cache memories other than the L1 cache memory and the L2 cache memory in the plurality of cache memories and allow the processor to access the second memory.

For example, when the total power consumption is predicted to decrease after turning off the LLC memory and accessing the second memory, the memory-policy interface driver 510 may select the first policy for the operation of the first memory.

For example, the LLC memory may be turned off when the plurality of cache memories includes the L1 cache memory, the L2 cache memory, the L3 cache memory, and the LLC memory, and the first policy is selected.

For example, when predicting that the total power consumption will decrease after turning off the cache memories other than the L1 cache memory and the L2 cache memory in the plurality of cache memories and accessing the second memory, the memory-policy interface driver 510 may select the second policy for the operation of the first memory.

For example, when the plurality of cache memories includes the L1 cache memory, the L2 cache memory, the L3 cache memory, and the LLC memory and the second policy is selected, the L3 cache memory and the LLC memory may be turned off.

According to an embodiment, the memory-policy interface driver 510 may predict that the power consumption based on the leakage-current reference value at a first temperature (e.g., 65° C.) or above will be greater than the power consumption of accessing the second memory.

For example, when the LLC memory is turned off at a temperature above the first temperature and below a second temperature (e.g., 85° C.), the memory power interface driver may determine that the power consumption due to the leakage current of the first memory is less than the power consumption of accessing the second memory, and select the first policy for the first memory.

For example, when the cache memories other than the L1 cache memory and the L2 cache memory are turned off at a temperature exceeding the second temperature (e.g., 85° C.), the memory-policy interface driver 510 may determine that the power consumption due to the leakage current of the first memory is less than the power consumption of accessing the second memory, and select the second policy for the first memory.

The first and the second policies described herein correspond to one embodiment among various example embodiments, and the memory-policy interface driver 510 may determine various other policies such as turning off all of the plurality of cache memories, turning off the caches other than the L1 cache in the plurality of cache memories, etc.

The first and the second temperatures disclosed exemplified are only examples, and the memory-policy interface driver 510 may use various different temperatures in setting the policies for the first memory due to the leakage current of the first memory.

The electronic device according to an embodiment may transmit the policy to be used to the first memory manager 570 and control the operation of the first memory according to the policy. For example, as shown in FIG. 5, the electronic device may transmit a policy determined in the memory-policy interface 510 to the first memory manager 570 (memory manager) via the resource-management interface framework 530, the mailbox 550, and the resource management framework 560. For example, the first memory manager 570 may control the operation of the first memory according to the policy.

As an example, the memory-policy interface driver 510, the temperature driver 520, and the resource-management interface framework 530 may operate in the kernel 500, and the resource management framework 560 and the first memory manager 570 may operate in the resource management core 540. The mailbox 550 may deliver messages transmitted and received between the kernel 500 and the resource management core 540.

Figure 6:
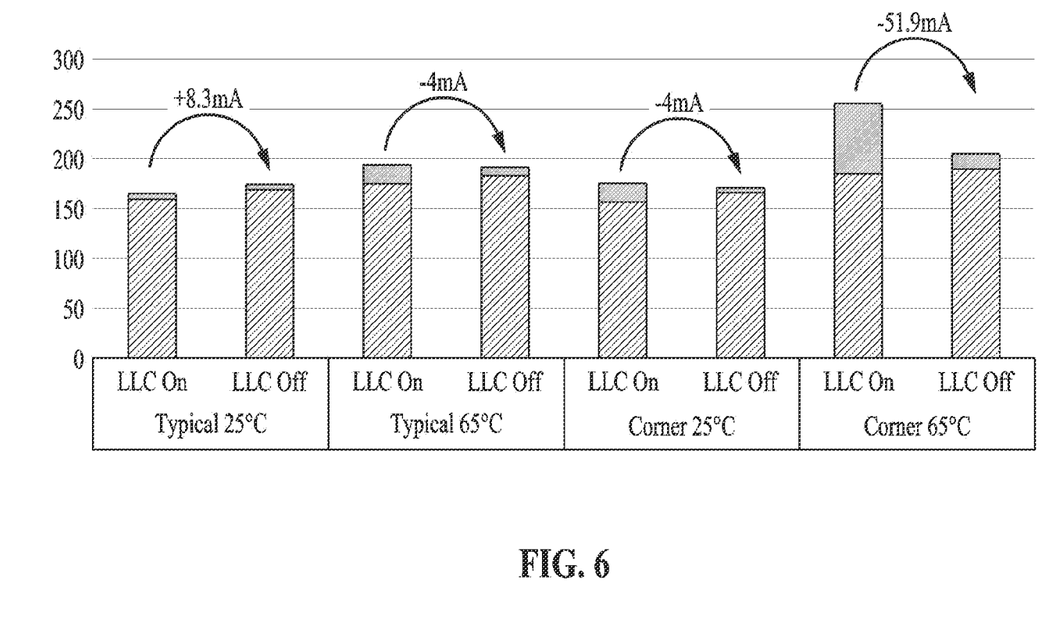
FIG. 6 is a drawing illustrating current values of a first memory and a second memory according to an embodiment.

FIG. 6 is a drawing illustrating current values of a first memory (e.g., the first memory 210-1 and 210-2 in FIG. 2) and a second memory (e.g., the second memory 220 of FIG. 2) according to an embodiment.

Referring to FIG. 6, an electronic device according to an embodiment may reduce the total current consumption by controlling the operation of the first memory. FIG. 6 illustrates the amount of change in total current consumption after controlling the operation of the first memory, respectively in a typical sample (a) at 25° C., a typical sample (b) at 65° C., a corner sample (c) at 25° C. and a corner sample (d) at 65° C. FIG. 6 is a diagram illustrating total current consumption before and after turning off an LLC memory of the first memory (e.g., the LLC memory 213 in FIG. 2), as an example. For example, the typical sample may refer to a sample of the first memory with small leakage current, and the corner sample may refer to a sample of the first memory with large leakage current.

Referring to (a) and (b) in FIG. 6, when the LLC memory of the typical sample is turned off at 25° C., the total current consumption increases by 8.3 mA, and when the LLC memory is turned off at 65° C., the total current consumption decreases by 4 mA. Since the leakage current of the first memory has increased when the temperature of the processor is 65° C., the electronic device may turn off the LLC memory in the first memory based on the predicted leakage current.

Referring to (c) and (d) in FIG. 6, when the LLC memory of the corner sample is turned off at 25° C., the total current consumption reduces by 4 mA, and when the LLC memory is turned off at 65° C., the total current consumption decreases by 51.9 mA. The magnitude of the leakage current of the first memory in the corner samples may be greater than the magnitude of the leakage current of the first memory in the typical samples under the same conditions. When the temperature of the processor is 25° C. or 65° C. or a temperature therebetween, the electronic device may turn off the LLC memory of the first memory based on the predicted leakage current.

According to an embodiment, the processor may control the operation of the first memory according to the internal temperature of the processor. For example, when the internal temperature of the processor exceeds a preset threshold value, the processor may control the operation of the first memory based on the leakage current of the first memory. For example, when the temperature of the processor is 25° C. as shown in FIG. 6 (c), even if the power consumption of the first memory due to the leakage current is greater than the power consumption when the processor accesses the second memory, the processor may access the LLC memory since the internal temperature of the processor does not exceed a preset threshold value (e.g., 60° C.).

According to an embodiment, when the difference between the power consumption of the first memory due to the leakage current and the power consumption when the processor accesses the second memory is greater than or equal to a preset threshold value, the operation of the first memory may be controlled. For example, as shown in (b) or (c) of FIG. 6, when the power consumption decreases by 4 mA when the processor turns off the LLC memory, the difference between the power consumption of the first memory due to the leakage current and the power consumption when the processor accesses the second memory may be below a preset threshold value. In (b) or (c) in FIG. 6, the processor may not turn off the LLC memory and may instead access the LLC memory.

A memory control method according to an embodiment may include measuring an internal temperature of a processor 120 by a thermal manage unit 230, predicting a leakage current of a first memory 210-1 and 210-2 based on the internal temperature and a voltage applied to the first memory 210-1 and 210-2, and controlling the operation of the first memory 210-1 and 210-2, wherein the processor may access a second memory 220 after accessing the first memory 210-1 and 210-2.

Controlling the operation of the first memory 210-1 and 210-2 may include comparing a first power consumption when the processor 120 accesses the second memory 220 with a second power consumption of the first memory 210-1 and 210-2 due to the leakage current to control the operation of the first memory 210-1 and 210-2 based on the comparison.

Controlling of the operation of the first memory 210-1 and 210-2 may include controlling the operation of at least one of a plurality of cache memories 211, 212 and 213 in the first memory 210-1 and 210-2.

Predicting a leakage current of the first memory 210-1 and 210-2 may include predicting the leakage current of the first memory according to the temperature of and the voltage applied to the first memory 210-1 and 210-2, based on a leakage-current reference value measured under a preset condition.

The first memory 210-1 and 210-2 may be an SRAM, and the second memory 220 may be a DRAM.

A memory control method according to an embodiment may include measuring a temperature of a processor 120 by a thermal manage unit 230, determining a policy on the operation of a first memory 210-1 and 210-2 based on the temperature, transmitting the policy to a first memory manager 570 to control the operation of the first memory 210-1 and 210-2 according to the policy, wherein the processor 120 may access the second memory 220 after accessing the first memory 210-1 and 210-2.

Determining a policy on the operation of the first memory 210-1 and 210-2 may include predicting the leakage current of the first memory 210-1 and 210-2 based on the temperature and a voltage applied to the first memory 210-1 and 210-2, determining the policy by comparing a first power consumption when the processor accesses the second memory 220 with a second power consumption of the first memory 210-1 and 210-2 due a leakage current.

Predicting the leakage current of the first memory 210-1 and 210-2 may include predicting the leakage current of the first memory 210-1 and 210-2 based on a leakage-current reference value measured under a preset condition.

The policy regarding the operation of the first memory 210-1 and 210-2 may include a policy on the operation of at least one cache memory in a plurality of cache memories 211, 212 and 213 in the first memory 210-1 and 210-2.

An electronic device 101 according to an embodiment may include a first memory 210-1 and 210-2, a second memory 220, a processor 120 accessing the second memory 220 after accessing the first memory 210-1 and 210-2, and a thermal manage unit measuring an internal temperature of the processor 120, wherein the processor 120 may identify the internal temperature of the processor 120 measured by the thermal manage unit, predict a leakage current of the first memory 210-1 and 210-2 based on the temperature and a voltage applied to the first memory 210-1 and 210-2, and control the operation of the first memory 210-1 and 210-2 based on the predicted leakage current.

The processor 120 may control the operation of the first memory 210-1 and 210-2 by comparing a first power consumption when the processor 120 accesses the second memory 220 with a second power consumption due to the leakage current.

The processor 120 may control the operation of at least one cache memory in a plurality of cache memories 211, 212 and 213 in the first memory 210-1 and 210-2.

The processor 120 may predict the leakage current of the first memory 210-1 and 210-2 according to the temperature and the voltage applied to the first memory 210-1 and 210-2, based on a leakage-current reference value measured under a preset condition.

The first memory 210-1 and 210-2 may be an SRAM, and the second memory 220 may be a DRAM.

An electronic device 101 according to certain example embodiments may include a first memory 210-1 and 210-2, a second memory 220, a processor accessing the second memory 220 following accessing the first memory 210-1 and 210-2, and a thermal manage unit 230 measuring an internal temperature of the processor 120, wherein the processor 120 may identify the temperature of the processor 120 measured in the thermal manage unit, determine a policy on the operation of the first memory 210-1 and 210-2 based on the temperature, transmit the policy to a first memory manager 570 to control the operation of the first memory 210-1 and 210-2 under the policy.

The processor 120 may predict a leakage current of the first memory 210-1 and 210-2 based on the internal temperature and a voltage applied to the first memory 210-1 and 210-2, and determine a policy by comparing a first power consumption when the processor 120 accesses the second memory 220 with a second power consumption due to the leakage current.

The processor 120 may predict the leakage current of the first memory 210-1 and 210-2 according to the temperature and the voltage applied to the first memory 210-1 and 210-2, based on a leakage-current reference value measured under a preset condition, A processor 120 according to certain example embodiments may include a first memory 210-1 and 210-2 and a thermal manage unit 230 measuring an internal temperature of the processor 120. The processor 120 may be configured to access a second memory 220 connected to the processor after accessing the first memory 210-1 and 210-2, identify the internal temperature of the processor 120 from the thermal manage unit 230, predict a leakage current of the first memory 210-1 and 210-2 based on the internal temperature and a voltage applied to the first memory 210-1 and 210-2, and operate the first memory 210-1 and 210-2 based on the predicted leakage current.

The electronic device according to certain example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that certain example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-predetermined integrated circuit (ASIC).

Certain example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to certain example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to certain example embodiments, each component (e.g., a module or a program) of the above-described components may include a single entity or multiple entities, and some of the multiple entities may be separately disposed in different components. According to certain example embodiments, one or more of the above-described components may be omitted, or one or more other components may be added. Alternatively or additionally, a plurality of components (e.g., modules or programs) may be integrated into a single component. In such a case, according to certain example embodiments, the integrated component may still perform one or more functions of each of the plurality of components in the same or similar manner as they are performed by a corresponding one of the plurality of components before the integration. According to certain example embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A memory control method comprising:
   measuring an internal temperature of a processor by a thermal manage unit;
   predicting a leakage current of a first memory based on the internal temperature and a voltage applied to the first memory;
   comparing a first power consumption when the processor accesses a second memory with a second power consumption due to the leakage current; and
   controlling the first memory based on the comparison,
   wherein the processor accesses the second memory after accessing the first memory.

2. The memory control method of claim 1, wherein the controlling of the first memory further comprises controlling an operation of at least one cache memory in a plurality of cache memories in the first memory.

3. The memory control method of claim 1, wherein the predicting of the leakage current of the first memory further comprises predicting the leakage current of the first memory based on a leakage-current reference value measured in a preset condition.

4. The memory control method of claim 1, wherein the first memory is a static random access memory (SRAM) and the second memory is a dynamic random access memory (DRAM).

5. A memory control method comprising:
   measuring a temperature of a processor by a thermal manage unit;
   predicting a leakage current of a first memory based on the temperature and a voltage applied to the first memory; and
   determining a policy on an operation of the first memory by comparing a first power consumption when the processor accesses a second memory with a second power consumption of the first memory due to the leakage current; and
   transmitting the policy to a first memory manager to control the operation of the first memory under the policy,
   wherein the processor accesses the second memory after accessing the first memory.

6. The memory control method of claim 1, wherein the predicting of the leakage current of the first memory further comprises:
   predicting the leakage current of the first memory based on a leakage-current reference value measured under a preset condition.

7. The memory control method of claim 5, wherein the policy on the operation of the first memory is a policy on an operation of at least one cache memory in a plurality of cache memories in the first memory.

8. An electronic device comprising:
   a first memory;
   a second memory;
   a processor accessing the second memory after accessing the first memory; and
   a thermal manage unit measuring an internal temperature of the processor,
   wherein the processor is configured to identify the internal temperature of the processor, predict a leakage current of the first memory based on the internal temperature of the processor and a voltage applied to the first memory, compare a first power consumption when the processor accesses the second memory with a second power consumption due to the leakage current, and control an operation of the first memory based on the comparison.

9. The electronic device of claim 8, wherein the processor is configured to control at least one cache memory in a plurality of cache memories in the first memory.

10. The electronic device of claim 8, wherein the processor is configured to predict the leakage current of the first memory based on a leakage-current reference value measured in a preset condition.

11. The electronic device of claim 8, wherein the first memory is a static random access memory (SRAM) and the second memory is a dynamic random access memory (DRAM).

12. An electronic device comprising:
    a first memory;
    a second memory;
    a processor accessing the second memory after accessing the first memory; and
    a thermal manage unit measuring an internal temperature of the processor,
    wherein the processor is configured to identify the internal temperature of the processor measured by the thermal manage unit, predict a leakage current of the first memory based the internal temperature and a voltage applied to the first memory, compare a first power consumption when the processor accesses the second memory and a second power consumption due to the leakage current, determine a policy on an operation of the first memory based on the comparison, transmit the policy to a first memory manager to control the operation of the first memory under the policy.

13. The electronic device of claim 12, wherein the processor is configured to predict the leakage current of the first memory based on a leakage-current reference value measured under a preset condition.

14. A processor comprising:
    a first memory; and
    a thermal manage unit measuring an internal temperature of the processor,
    wherein the processor is configured to access a second memory connected to the processor after accessing the first memory, identify the internal temperature of the processor measured by the thermal manage unit, predict a leakage current of the first memory based on the internal temperature and a voltage applied to the first memory, compare a first power consumption when the processor accesses the second memory and a second power consumption due to the leakage current, and control an operation of the first memory based on the comparison.

* * * * *